Patented May 9, 1950

2,507,263

UNITED STATES PATENT OFFICE 2,507,263

PRODUCTION OF PLASTICIZED PROLAMINE AND DERIVATIVE COMPOSITIONS

Willard L. Morgan, Columbus, and Carl R. Faelten, Clinton Township, Franklin County, Ohio, assignors, by direct and mesne assignments, to American-Maize Products Company, a corporation of Maine No Drawing. Application November 24, 1944, Serial No. 565,064

22 Claims. (Cl. 106—153)

This invention relates to the novel use of certain materials as plasticizers for prolamines, and to the resultant plasticized prolamine and prolamine base compositions. More particularly, there are herein described plastic compositions and methods of forming such compositions, and articles thereby secured, in which materials such as zein, corn protein or other cereal prolamines are plasticized by organic acids characterized by the presence of one or more ether linkages. In such manner we may use the methoxybenzoic acids, ethoxyacetic acid and other similar organic etherized acids.

It is an object of this invention to provide novel plasticized compositions of "prolamine-base" protein.

It is another object of this invention to provide novel prolamine-base compositions with plasticizers exhibiting highly desirable compatibility and solvency for the prolamines, thus permitting the preparation directly of plastic masses, coatings and films with the prolamines.

It is a still further object of this invention to provide novel prolamine-base compositions having plasticizers for prolamines of improved compatibility characteristics which compositions may be applied in solvents as adhesives or coatings, or thus applied in forming films or plastics.

Other and ancillary objects of this invention will be apparent from the detailed description and examples thereof hereinbelow set forth.

The prolamines have long been established as exhibiting certain properties unique among the proteins, and as such have been classified by workers dealing with proteins as a separate group thereof. By definition, the prolamines are those proteins characterized by solubility in aqueous ethyl alcohol. They are found only in cereal grains and, contrasted to other proteins, are high in the amino acid proline and amide nitrogen content, and are deficient in free amino groups and in lysine. They are very nearly or entirely insoluble in water and weak aqueous acid solutions, but are freely soluble in dilute alkali.

Although in the following description and examples we shall refer to the particular prolamine zein which is derived from corn, it is to be understood that this invention is equally applicable to the other prolamines, that is, to hordein, derived from barley; to kafirin, derived from sorghum; to gliadin, which is derived from wheat; to secalin derived from rye, and to the cereal glutens generally.

The diverse and potentially large-scale utilization of plasticized prolamine compositions has long been attractive, and the discovery of satisfactory plasticizers for the prolamines in general, and, in particular, for the prolamine zein which is of industrial importance, has been the object of extensive investigation. Various plasticizers for this purpose have been proposed, but most of such prior art materials have exhibited low plasticizing activity or undesirable characteristics such as incomplete compatibility, high melting point, strong odors, water solubility or rapid loss by volatilization from the prolamine, thereby, and in other ways, resulting in compositions which are unsatisfactory commercially in one respect or another.

It has previously been proposed to plasticize various proteins, including the prolamine zein, with various organic acids, such for example as the saturated and unsaturated aliphatic acids, such as for example butyric acid, caprylic acid, caproic acid, capric acid, stearic acid, linoleic acid, oleic acid, naphthenic acids and the like. However, these present various disadvantages; thus, the offensive odor of the shorter straight chain fatty acids and of the naphthenic acids practically preclude their use, while the longer straight chain fatty acids and some naphthenic acids are very poorly compatible and exhibit negligible plasticizing activity. Certain aromatic organic acids, such as benzoic acid, salicylic acid, anthranilic acid, orthobenzoyl benzoic acid, orthotolyl benzoic acid, orthocreosotic acid and naphthoic acids have been suggested as plasticizers for prolamines, and while these are generally more effective as plasticizers than the fatty acids, it has not been generally possible to utilize them, due to their generally high melting points offering difficulties in the forming of plastics, and due to their tendency to crystallize out in the plastics and to cause the same to become brittle.

The new compounds employed as plasticizers in this invention, namely the etherized organic acids, have shown distinct advantages over the prior art materials in exhibiting very high plasticizing activity and very high solvent action upon the prolamines and derivative proteins thereof. Consequently it has been readily possible to form plastics, and further, by reason of such strong solvent activity, the plasticized materials have generally been free of any tendency for the ether acids to separate from the composition and crystallize, thus giving stable plastic compositions directly useful in the arts.

In this invention there is set forth the surprising discovery that organic ether acids, particularly ether carboxylic acids, having a total number of carbon atoms not in excess of 21 function as remarkably effective plasticizers for prolamines and derivative proteins thereof. Organic ether compounds generally have been found to be without any solvent activity upon the prolamines and to lack plasticizing activity. Thus simple ethers such as ethyl, butyl, or hexyl ethers, are not solvents for zein or other prolamines. The same is true for methylphenyl ether and for diphenyl ether. Likewise, completely etherized products such as dimethoxy tetraglycol, or the diethyl ether of diethylene glycol, are without solvent action and without plasticizing action upon the prolamines. It is, therefore, quite surprising that the introduction of an ether group into an organic acid molecule is found to increase greatly both the solvent action and the softening or plasticizing action upon the various prolamines and particularly upon zein. A further unexpected highly desirable result arises from the fact that such introduction of an ether group into the organic carboxylic acids does not appreciably or greatly increase the water solubility of the etherized acid as compared to the simpler carboxylic acid. This contrasts to the generally great increase in water-solubility which occurs when ether groups are introduced into organic compounds generally. By reason of the much higher degree of mutual compatibility and solvency of the prolamine for the plasticizer, and the plasticizer for the prolamine, there is found to be an absence of tendency for the ether acids to crystallize or sweat out from plastics made from these materials.

Generally speaking, we may employ etherized organic acids carrying either or both alkyl or aromatic groups. We may also employ etherized acids in which cycloalkyl or heterocyclic groups are present. The etherized acids which we have found to be effective plasticizers for prolamines may be represented by the general formula R'—O—R—COOH wherein R and R' represent organic groupings either of similar or unlike nature and C, O and H represent carbon, oxygen, and hydrogen respectively. We find, however, that when the total number of carbon atoms is increased the activity as a solvent and as a plasticizer for prolamines generally decreases, and in general we have found that those having more than 21 carbon atoms in the molecule do not exhibit a desirable useful degree of activity in these respects. While it is apparent that the odor, water solubility, and boiling point as well as the direct compatibility and solvency will thus vary with the molecular size of the compound, it is also apparent that suitable characteristics in all of these respects may be secured depending upon the choice of the organic groups employed in the etherized acids. More than one ether group may be present in the acid, although such generally leads to increased water solubility. More than one carboxylic group may also be present. Generally, the activity of the compounds as solvents and plasticizers for prolamines is increased as either the number of ether or of carboxylic acid groups in the compound is increased. We have also found it frequently advantageous to have present in the etherized acid molecule, hydroxyl or amino groups, but where such substituent is present, it is undesirable, generally, to have more than one hydroxyl or one amino group present for more than each group of three carbon atoms in the molecule.

Unsaturation in the acid molecule generally also desirably influences the plasticizing activity. The acids may also carry organic groupings (R or R') having in them ester linkages, ketone groups, or halogens, but generally the presence of any of these groups has been found not to increase the plasticizing activity but often to be slightly adverse in giving somewhat poorer solvent effects and lowered compatibility. Etherized acids in which branch chains appear in either organic grouping, R or R', may also be employed. Such branch chains in alkyl organic acids have been found to offer certain advantages in plasticizers for prolamines as more particularly set forth in a co-pending application Serial No. 565,065, filed November 24, 1944, by the co-applicant Morgan hereof, now No. 2,410,124, issued October 29, 1946.

Specifically, we have found that ether acids, as follows, in which both R and R' are of alkyl nature or substituted alkyl nature, have been found to be useful as plasticizers for the prolamines:

Methoxy acetic acid
$CH_3OCH_2COOH$

Ethoxy acetic acid
$C_2H_5OCH_2COOH$

Hexyl oxy acetic acid
$CH_3(CH_2)_5OCH_2COOH$

Octadecyloxy acetic acid
$CH_3(CH_2)_{17}OCH_2COOH$ a-Ethoxy propanoic acid
$C_2H_5OCHCOOH$
        $|$
       $CH_3$ b-Ethoxy propanoic acid
$C_2H_5OCH_2CH_2COOH$ Cyclohexyloxy propanoic acid
$C_6H_{11}OCH_2CH_2COOH$ Octadecyloxy propanoic acid
$CH_3(CH_2)_{17}OCH_2CH_2COOH$ Ethoxy hexanoic acid
$C_2H_5O(CH_2)_5COOH$ Ethoxy succinic acid
$CH_2—COOH$
   $|$
$C_2H_5O—CH—COOH$ Butoxyethoxy acetic acid
$C_4H_9OC_2H_4OCH_2COOH$ Mono(ethoxy ethyl) azelaic acid
$C_2H_5OC_2H_4OOC(CH_2)_7COOH$ Allyloxy acetic acid
$CH_2=CH—CH_2OCH_2COOH$ b-Chlorethoxyethoxy acetic acid
$ClCH_2CH_2OCH_2CH_2OCH_2COOH$ b-Amino ethoxy acetic acid
$NH_2CH_2CH_2OCH_2COOH$ b-Hydroxy ethoxy acetic acid
$HOCH_2CH_2OCH_2COOH$ a-Acetic acid ether of tetraethylene glycol acid
$HOCH_2CH_2O(CH_2CH_2O)_3CH_2COOH$ a-Acetic acid ether of nonaethylene glycol acid
$HOCH_2CH_2O(CH_2CH_2O)_8CH_2COOH$ Other examples of etherized carboxylic acids which we have found useful as prolamine plasticizers in which both R and R' are of aryl or substituted aryl nature are as follows:

Benzyloxy benzoic acid
$C_6H_5CH_2OC_6H_4COOH$

Phenoxy benzoic acid
$C_6H_5OC_6H_4COOH$

Benzophenoxy benzoic acid
$C_6H_5COC_6H_4OC_6H_4COOH$

Two types of etherized organic acids are possible in which an alkyl and an aryl grouping are present in the same molecule, the difference in the two types depending upon to which grouping the carboxylic acid group is attached. As examples of such acids that may be employed as prolamine plasticizers in which the acid group is attached to an alkyl group we supply the following list:

Phenoxy acetic acid
$C_6H_5OCH_2COOH$

Naphthoxy acetic acid
$C_{10}H_{11}OCH_2COOH$

Para-tertiary butyl phenoxy propanoic acid

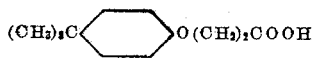

Chlorophenoxy acetic acid
$ClC_6H_4OCH_2COOH$

As prolamine plasticizers of the mixed ether type in which the carboxylic group is attached to an aryl group we have found the following acids to be useful:

Methoxy benzoic acid
$CH_3OC_6H_4COOH$

Ethoxy benzoic acid
$C_2H_5OC_6H_4COOH$

Ethoxy ethoxy benzoic acid
$C_2H_5OC_2H_5OC_6H_4COOH$

Methoxynaphthoic acid
$CH_3OC_{10}H_6COOH$

Butoxyethoxy phthalic acid
$C_4H_9OC_2H_5OC_6H_3(COOH)_2$

Methoxysalicylic acid
$CH_3OC_6H_3(OH)COOH$

Hydroxyethoxy benzoic acid
$HOCH_2CH_2OC_6H_4COOH$ 3,4-dimethoxy benzoid (veratric) acid
$(CH_3O)_2C_6H_3COOH$ 2,3,4-trimethoxy benzoic acid
$(CH_3O)_3C_6H_2COOH$ Mixtures of these ether carboxylic acids combined in any proportions whatever with each other constitute effective prolamine plasticizers. The ether carboxylic acids may also be employed as plasticizers in prolamine plastics in combination with other known plasticizers, such as dibutyl tartrate or para toluene sulfonamide. The amount of plasticizer which may effectively be incorporated with the prolamine to result in a useful, plasticized composition, occupies an extremely broad range of percentages based on total product composition, and the amount employed will depend upon the properties desired in the plastic to be produced. For example, if 5% (by weight of the resultant composition) of ether carboxylic acid plasticizer be incorporated with, say, the prolamine zein, the plasticized product is hard and tough in character. When on the other hand, increasingly greater percentages of plasticizer are incorporated with the zein, the resultant compositions exhibit increased flexibility and softness such that at a content of 50% by weight in the product the plastics often have rubber-like properties. When 80 to 95% by weight of the resultant composition consists of the described plasticizer, the products are permanently soft and tacky. Fundamental product characteristics may be regarded, then, as a function of plasticizer content, and it therefore follows that the amount of plasticizer to be incorporated with a prolamine will be determined by the use to which the product is to be put. Further it is apparent that not all of the etherized acids are of equal effectiveness as already pointed out and by suitable choice from among such acids, more or less harder plasticized prolamine compositions may be made with a given amount of plasticizer, depending upon the plasticizer actually employed. It is evident, then, that a wide range of plasticized compositions are obtainable by means of this discovery, and, further, that product characteristics may be modified at will by judicious choice of the quantity of plasticizer incorporated with the prolamine.

The plasticized compositions resulting from practice of the present invention have been found to be of versatile utilities not only as plastic rods, sheets and molded articles, but also as coatings of various types. Thus, for example, these compositions may be made into solutions and applied as a sizing; utilized for impregnating and coating, particularly for grease-proofing and water-proofing purposes; and applied to the production of flexible films, lacquers, wall and floor paints, deck enamels, grease- and moisture-proof lacquers for application to metallic surfaces, protective varnishes for printed and other paper surfaces, adhesives, laminated products of various types, plastic compositions, linoleum, oilcloth, and the like. These uses are, of course, cited as being illustrative only of the diverse applications of the novel compositions, and as in no way imposing limitations thereon, there being many related and other uses which will at once be apparent to those skilled in such arts.

In practicing this invention, the optimum quantities of plasticizer to be incorporated to secure the qualities desired for the use to which the resultant composition is to be put, will at once be apparent to those skilled in the respective arts from the further description and examples hereinafter set forth.

As a general procedure, the prolamine and plasticizer may be thoroughly mixed in the desired proportions at room temperature. The mixture may then be heated and maintained at a more or less elevated temperature until homogeneity has been attained, as evidenced by disappearance of the prolamine and plasticizer as individual entities with consequent formation of a single homogeneous mass. This may be carried out in internal mixing machines or upon plastic milling rolls. Pigments, dyes, fillers, resins and the like may be added to the masses while in these machines. Upon cooling to room temperature, the plasticized composition may be more or less hard and pliable, depending upon the amount and nature of plasticizer incorporated therein, as hereinabove set forth. In the incorporation of other materials with plasticized prolamine compositions for the production of lacquers, sizings, coating or impregnating materials, printing inks, adhesives, or the like, it is frequently advantageous to mix all of the individual components thereof including solvents at the outset of operations, rather than to plasticize the prolamine preliminarily and thereafter to incorporate the plasticized product with the other compounding materials, although such may be done. However the sequence of such operations is not at all critical, and in general will be governed by the character of the technical operations involved, by the arrangement thereof which results in optimum process economies, and by the established production methods conventionally practiced in each particular industry.

As hereinabove set forth, the plasticizers of the present invention may be employed, alone or in conjunction with other known plasticizers, for various plastic modified prolamine compositions, such as, for example, aldehyde-reacted prolamine plastics. It is well known to react prolamines with aldehydes, particularly formaldehyde, to form solutions, coatings, and thermosetting plastic compositions of improved water resistance and widely varying properties depending upon the nature and amount of ingredients incorporated therein, and upon the temperature and duration of aldehyde reaction. If desired, the plasticized prolamine compositions of this invention may be aldehyde-cured according to conventional techniques, to result in useful plastics and coating compositions which, after curing, are no longer thermoplastic, but are thermosetting in nature, and by reason of the plasticizers set forth in the present invention are flexible and tough. It is apparent that while aldehyde-curing operations with plastics and coatings are preferably carried out upon conclusion of plasticization of the prolamine materials, it is possible to add the plasticizers to solutions of prolamines which have been first reacted with the aldehydes.

As is well-known, the prolamines are a group of proteins characterized by solubility in aqueous alcohol solutions which are found only in certain cereal grains. The well-known prolamines include zein, found in corn, gliadin, found in wheat, hordein, found in barley, secalin from rye, sorghumin from sorghum, and the alcohol-soluble protein extractable from oats.

The prolamines constitute a large portion of the protein found in the starchy or endosperm parts of the cereal grains and the proteins are commonly isolated from such starchy portions after the grains have been de-germinated, as for example in cornstarch manufacture by the wet-milling process or in the manufacture of wheat or other flours by the dry-milling process. The starches may be removed by mechanical washing action as in the preparation of wheat gluten, by wet kneading of the floury mixture, or they may be removed as in the commercial separation of cornstarch. The protein concentrates thus secured may then be extracted by aqueous alcohol or otherwise treated to produce more concentrated or purified alcohol-soluble prolamines as is well known in the art for producing zein and gliadin. These various prolamines may be used to manufacture prolamine compositions and plastic products and be cured with formaldehyde. Certain modifications or derivatives of the prolamines have become available, such as for instance zein acetate or zein modified by heat and water-vapor or water treatment; these may be plasticized to compositions of the present invention and when compositions or plastics are formed of prolamines with aldehydes, the resultant compositions may likewise be plasticized with the ether carboxylic acids in accordance with this invention.

Prolamine plastic compositions may also be formed from the crude protein concentrates derived directly from the degerminated cereals when these contain a considerable proportion of a prolamine. Thus, as a suitable corn protein for forming plastics we may use the corn gluten resulting from the commercial separation of cornstarch in the wet-milling process which may contain from 40 to 65% of corn proteins primarily of prolamine nature, a large part being the alcohol-soluble prolamine. The non-protein remainder of the gluten consists primarily of starch with small quantities of cellulosic bodies and fatty substances. Partially purified corn glutens such as those produced in Shildneck Patent No. 2,274,004 by further removal of starch with acids, or as shown in Schopmeyer Patent, U. S. No. 2,310,104, wherein fatty materials are removed and which contain 60 to 100% by weight of protein content, may also be used in making cured corn protein compositions and plastics and aldehyde-cured products, which may be further modified with the plasticizers in accordance with the present invention. It will be understood that as the word "prolamine-base" protein is used in the description here given and in the appended claims, we include by such term not alone the purified prolamines isolated from the various cereal grains, but also include cereal protein products and mixtures of cereal proteins produced from the endosperm which contain a considerable proportion of prolamine, and also include by such term modified or chemically altered prolamines and aldehyde-cured prolamine products, as "prolamine" base derivatives.

The following examples will serve to illustrate, to a more or less limited extent, the scope of the present invention, and the presently more important practical applications thereof. It is to be explicitly understood that the present invention is in no way limited to the applications thereof set forth in these examples, nor to the particular ingredients or to the amounts therein specified, since equivalent ingredients in varying percentages may be used for these and other applications, as will be readily apparent to those skilled in such arts. Thus, for instance, in those examples in which individual solvents or solvent mixtures are employed, it is to be understood that any solvent or solvent mixture exhibiting solvency for the prolamine and for the plasticizer will function adequately as a mutual solvent for the unplasticized and for the plasticized "prolamine-base" protein materials. Thus, for example, ethylene glycol monomethyl ether, aqueous ethyl alcohol, aqueous isopropyl alcohol, aqueous diacetone alcohol, diethylene glycol monoethyl ether, and diethylene glycol monomethyl ether are individually solvents both for zein and for the plasticizers of this invention, and therefore function, either separately or in combination, as solvents for both unplasticized and plasticized "prolamine-base" protein materials. Other solvents such as toluene may be added in certain amounts to such solvent mixtures for certain desirable purposes functioning as auxiliary solvents of which many are known in the prolamine solvent art.

*Example 1*

By weight 70 parts of zein and 30 parts of ethoxyacetic acid were placed in a jacketed internal plastic mixer of the dough type used in the rubber industry and thoroughly mixed at room temperature. Ethoxyacetic acid is a liquid boiling at a temperature of about 206° C., and soluble to a certain extent in water. The agitated mix was then heated to a temperature not exceeding 130° C., and maintained at a temperature in the general range from 100° to 130° C., for a period of about 60 minutes, at which time plasticization of the zein had been substantially completed as evidenced by disappearance of the zein and ethoxyacetic acid as separate entities, thereby resulting in a uniform homogeneous plastic solution. Upon cooling to room temperature this product was found to be clear, transparent, substantially colorless and uniform when viewed in thin sections. It was a thermoplastic composition, which could when again heated be extruded and molded into formed plastic articles, such as plastic tubes, doorknobs, toys and the like. These plastic articles were tough and could be deformed and fractured only with difficulty.

Example 2

By weight 10 parts of ethoxyhexanoic acid, 5 parts of octadecyloxy acetic acid, 15 parts of oleic acid, and 10 parts of dibutyl tartrate were thoroughly mixed at room temperature. The resultant mixture was heated in a jacketed mixer to a temperature in the general range from 120° C. to 135° C., while 60 parts of zein were gradually mixed in during the course of an hour. The plastic dough was further worked for a period of about 20 minutes, at which time a clear, homogeneous plastic solid solution had resulted and plasticization of the zein was substantially complete. Upon cooling a small portion to room temperature the product was found to be a clear, homogeneous, substantially transparent and colorless thermoplastic composition, relatively tough and pliable at ordinary temperatures, and thus directly usable as a plastic. When the mass was cooled to below 70° C., there was incorporated in the main plastic batch by weight 30 parts of rosin and thereafter 1 part of trioxymethylene. The batch was then sheeted on rubber rolls at below about 70° C. Then pieces were inserted into a mold of a suitable shape and the pieces were thus pressed in a heated press at 250 lbs. per square inch at 135° C., for one-half hour. This gave plastic articles generally similar to those produced by Example 1, but distinguished therefrom by not being thermoplastic and by having greater water-resistance.

Example 3

A rubber-like plastic suitable for use as a shoe sole was made by mixing in an internal mixer the following ingredients:

| | Parts by weight |
|---|---|
| Zein | 37 |
| Mono(ethoxyethyl) azelaic acid | 44½ |
| Trioxymethylene | 1½ |
| Clay | 12 |
| Carbon black | 5 |

Mono(ethoxyethyl) azelaic acid is an oily, water-insoluble liquid boiling with some decomposition at a temperature of about 260° C. The zein and plasticizer were first entered into the internal mixer and therein worked for approximately one hour. Then the pigments were added in small portions at a time so as to provide a homogeneous mixture. The working of the mass readily provides heat, and it was then cooled to below 80° C. by a water-cooled jacket upon the internal mixer. Thereafter the trioxymethylene was quickly introduced and milled in during a short period of time of five minutes or less at below about 80° C. The plastic mass was then removed from the internal mixer and sheeted out at below about 80° C. upon a rubber milling roll. Portions of the resulting thermoplastic uncured sheet were then placed within an ordinary shoe-sole mold, such as is used in the rubber trade. Curing was then carried out by heating such mold to 130° C., for one-half hour under a hydraulic pressure of 100 to 500 lbs. per square inch. Such pressures have been found suitable in the manufacture of plastics from prolamines. The product was tough and flexible and in general had qualities similar to ordinary rubber shoe soles.

Example 4

As an example wherein there is employed a crude mixture of cereal proteins containing prolamines, hard tough prolamine plastic articles such as door knobs of a black color were made by molding under similar conditions to those used in Example 3 masses of the following plastic mixture:

| | Parts by weight |
|---|---|
| Corn gluten, 60% protein content | 40 |
| "Nevillac 10" (coumarone indenephenyl resin) | 35 |
| c-Phenoxybenzoic acid | 5 |
| Naphthoxyacetic acid | 5 |
| Asbestine | 8 |
| Channel Black | 5 |
| Trioxymethylene | 2 | o-Phenoxybenzoic acid is a solid melting at 114.5° C. and boiling with decomposition at a temperature of about 355° C., and soluble in 100 parts of water to the extent of about 0.01 part. Naphthoxyacetic acid is a water-insoluble solid melting at 153° C. In making the plastic mixture the plasticizers, resin and gluten were first mixed in a plastic masticating machine. The pigments were then incorporated by adding small portions at a time and the mass worked until it was thoroughly uniform. While still in the plastic machine, the mass was then cooled to 75° C., and the trioxymethylene quickly introduced. After further working for approximately 5 minutes to distribute the formaldehyde compound uniformly throughout the mass it was removed from the mixer and sheeted in milling rolls at a temperature not over 75° to 80° C., prior to actual molding operations at temperatures above 120° C.

Example 5 o-Ethoxybenzoic acid is a liquid which boils with slight decomposition at a temperature of about 300° C., and is only slightly soluble in cold water. By weight 40 parts of zein and 60 parts of o-ethoxybenzoic acid were dissolved at room temperature in a solvent mixture comprised of about 30 parts by weight of methyl Cellosolve and about 70 parts by weight of 95% (by volume) ethyl alcohol. The resulting solution was found to be directly applicable for many uses; for example, for sizing, coating, impregnating and waterproofing textiles, paper, wood, tinplate and the like. As a coating material, the solution was eminently suited for application to varnished, lacquered, and the like, surfaces. Further, it was found to form removable, strong, tough, pliable, transparent films when cast upon an oiled or waxed glass surface. In addition to these properties, the films were oil-resistant, hard and non-tacky in nature, and furnished an excellent surface for printing purposes. When applied to paper there resulted excellent grease- and moisture-proof coatings, giving flexible wrappings suitable for food-stuff packaging. Coated upon tinplate the coating was found to withstand can-forming operations and repeated flexing without cracking. The coating was excellent in grease resistance.

*Example 6*

By weight 20 parts of cereal gluten derived from corn, 40 parts of butoxyethoxyacetic acid, 10 parts of tetraethylene glycol and 25 parts of carbon black were thoroughly ground together on a roller mill. The resultant product was found to be suited for use as an ink for printing cotton bags.

*Example 7*

By weight 47 parts of zein, 47 parts of mono-(ethoxyethyl) azelaic acid, 6 parts of p-methoxy benzoic acid, 100 parts of clay, and about 50 parts of 80% (by volume) aqueous ethyl alcohol and 15 parts ethyl lactate, were thoroughly mixed and ground in a ball mill for a period of about 24 hours. The resultant composition was knife-coated onto a sized woven sheeting base, which was then force-dried for about 1 hour at a temperature of about 150° F. The resultant "oil-cloth" type of product exhibited excellent wearing qualities, resistance to flexing and to the action of water, acids, and greases. p-Methoxybenzoic acid (anisic acid) is a solid, melting at 184.2° C., boiling at a temperature of about 280° C., and soluble in 100 parts of water to the extent of about 0.04 part at 18° C.

*Example 8*

Phenoxyacetic acid is a solid, melting at 99° C., boiling with slight decomposition at a temperature of about 285° C., and soluble in 100 parts of water to the extent of about 1.2 parts at 10° C. By weight 95 parts of zein, 5 parts of phenoxyacetic acid, 0.1 part oil soluble dyestuff Yellow OB, and about 240 parts of a solvent mixture consisting of 80 parts by weight of diacetone alcohol and 160 parts by weight of 95% (by volume) ethyl alcohol, were mixed together overnight in a ball mill. The product was a shellac substitute eminently suited for coating wooden surfaces.

*Example 9*

By weight 75 parts of gliadin and 25 parts of ethoxyacetic acid were thoroughly mixed at room temperature. The resultant mixture was heated to a temperature of about 127° C., and maintained at a temperature in the general range from 120° C. to 135° C., for a period of about 35 minutes, at which time a clear, homogeneous solution had resulted indicating complete plasticization of the gliadin. Upon cooling to room temperature a clear, transparent, substantially colorless, thermoplastic product resulted. When all of the resulting mass was dissolved at room temperature in a volatile solvent mixture consisting by weight of about 65 parts of 95% (by volume) ethanol, and 20 parts of acetic acid, and about 15 parts of water, the resultant composition exhibited excellent properties as a quick-drying adhesive. In place of the 75 parts of gliadin a similar glue may be made by substituting 75 parts of hordein.

*Example 10*

To 4 parts by weight of zein there was added 1 part of sulfonated castor oil and 95 parts of a-acetic acid ether of octaethylene glycol. After the zein dissolved in the plasticizer the mixture was applied to rayon yarns as a size which provided such yarns with a certain amount of stiffening and served as an adhesive to hold such yarns together and further to lubricate the yarns during spinning operations. Some water may be added to the mixture during application, and the composition may be removed from the yarn by dipping it into water.

*Example 11*

By weight 45 parts of b-ethoxypropanoic acid, 10 parts of carbon black, and 20 parts of whiting were mixed together and thoroughly ground on a roller mill. With the resultant mixture were incorporated, at room temperature, 55 parts of zein acetate and about 150 parts of a solvent mixture consisting of about 45 parts by weight of ethylene glycol monomethyl ether and about 105 parts by weight of isopropyl alcohol. The resultant homogeneous product was knife-coated onto a woven fabric base. The impregnated fabric was then baked at a temperature within the general range from 170 to 180° F., for a period of about 2 hours. The resultant material was a dull black artificial leather which was adaptable to embossing operations.

*Example 12*

Twenty grams of zein were dissolved in 50 ml. of 95% (by volume) ethyl alcohol and 18 ml. of commercial aqueous formalin (40% by volume), and the solution was treated in an autoclave at 15 lbs. steam pressure or 121° C., for 1 hour. To the solution of prolamine reaction product thus produced there was then added 10 grams of hexyloxyacetic acid. Upon coating the lacquer thus produced upon tinplate flexible clear coatings were secured which if further heated for 3 hours at a temperature above 130° C., became quite water-resistant as well as grease-resistant and highly flexible.

*Example 13*

To 7 parts by weight of a 63 percent solids solution of the sodium salts of the sulfonated fatty acid and rosin mixture, such as is secured as a by-product in sulfate paper pulp digestion and sold as sulfonated "Indusol," there was added 74 parts by weight of water, 1 part by weight of borax, 2 parts by weight of urea and 7 parts by weight of alpha acetic acid ether of tetraethylene glycol. There was then introduced into this solution 15 parts by weight of a de-starched, de-oiled corn gluten analyzing 73 percent protein content and 1 part by weight of lamp black and the whole slowly heated with continuous agitation to a temperature of about 165° F. After being maintained at a temperature in the general range from 160° to 170° F., for about 2 hours, the mixture had become a smooth paste. This was roller-coated onto a piece of cotton cloth of 80 x 80 threads per inch square. After drying, a stiffened fabric, exhibiting a black finish, resulted. This prepared material was eminently suited for use as a window shade cloth having appropriate stiffness and flexibility for such use, and it evidenced only very slight tendencies to crack upon aging after numerous flexings. The mixture may also be employed as an interior wall paint preferably after adding per one part by weight thereof 0.5 part by weight of water.

*Example 14*

A zein dispersion in water with ammonium rosinate was prepared according to the method of Drewsen and Little (U. S. Patent No. 2,247,531) as follows: first, a paste of zein and aqueous ammonia was prepared in a mechanical mixer by incorporating therein by weight 4 parts of zein, 6 parts of water and 1 part of aqua ammonia (26° Bé.). Then a stiff homogeneous mixture of ammonium rosinate was prepared by thoroughly mixing for several hours at an elevated temperature not in excess of 200° F., 4 parts by weight (dry basis) of papermaker's rosin and about 1 part by weight of aqua ammonia (26° Bé.). The prepared zein paste and ammonium rosinate were then thoroughly mixed, resulting in a zein-rosinate composition. There was then added to the mix thus prepared 2 parts by weight of b-hydroxyethoxyacetic acid to act as a plasticizer. This ether acid was readily emulsified and dissolved into the mix. This was then employed to clay-coat paper by first mixing it with a clay dispersion. A suitable clay dispersion was prepared by slurrying together by weight 400 parts of kaolin, 200 parts of water and 5.5 parts of sodium pyrophosphate. To 3 parts by weight of the clay slurry there was then added 1 part by weight of the plasticized zein dispersion, and the resulting coating product was screened. This material exhibited excellent qualities as a paper coater and gave a clay-coated paper of satisfactory adhesion and wax-pick test.

The foregoing description and examples will point out that the invention is subject to numerous embodiments not herein illustrated, but falling within the scope of the appended claims.

We claim:

1. A plasticized "prolamine-base" protein composition comprising plasticized "prolamine-base" protein having as plasticizer therefor ether monocarboxylic acid having not over 21 carbon atoms.

2. A plasticized prolamine composition comprising plasticized zein having as plasticizer therefor ether monocarboxylic acid having not over 21 carbon atoms.

3. A plasticized "prolamine-base" protein composition comprising plasticized prolamine-containing cereal gluten having as plasticizer therefor ether monocarboxylic acid having not over 21 carbon atoms.

4. A plasticized "prolamine-base" protein composition comprising plasticized "zein-base" protein having as plasticizer therefor ether monocarboxylic acid having not over 21 carbon atoms.

5. A plasticized prolamine composition consisting of plasticized prolamine having as plasticizer therefor ether monocarboxylic acid having not over 21 carbon atoms.

6. A plasticized prolamine composition consisting of plasticized zein having as plasticizer therefor ether monocarboxylic acid having not over 21 carbon atoms.

7. A plasticized "prolamine-base" protein composition consisting of plasticized prolamine-containing cereal gluten having as plasticizer therefor ether monocarboxylic acid having not over 21 carbon atoms.

8. A plasticized "prolamine-base" protein composition consisting of plasticized "prolamine-base" protein having as plasticizer therefor ether monocarboxylic acid having not over 21 carbon atoms.

9. A plasticized "prolamine-base" protein composition comprising by weight from 5 to 95 parts of plasticized "prolamine-base" protein having as plasticizer therefor from 95 to 5 parts of ether monocarboxylic acid having not over 21 carbon atoms.

10. A plasticized "prolamine-base" protein composition comprising by weight from 5 to 95 parts of plasticized "zein-base" protein having as plasticizer therefor from 95 to 5 parts of ether monocarboxylic acid having not over 21 carbon atoms.

11. A "prolamine-base" protein composition comprising in homogeneous association "prolamine-base" protein and as plasticizer therefor ether monocarboxylic acid having not over 21 carbon atoms.

12. A prolamine composition comprising in homogeneous association prolamine and as plasticizer therefor ether monocarboxylic acid having not over 21 carbon atoms.

13. A "prolamine-base" protein coating composition comprising in solution form dissolved "prolamine-base" protein, as plasticizer therefor dissolved ether monocarboxylic acid having not over 21 carbon atoms, and a volatile mutual solvent for said materials.

14. A "prolamine-base" protein coating composition comprising by weight and in solution form from 5 to 95 parts of dissolved "prolamine-base" protein, as plasticizer therefor from 95 to 5 parts of ether monocarboxylic acid having not over 21 carbon atoms, and a volatile mutual solvent for said materials.

15. A "zein-base" protein coating composition comprising by weight and in solution form from 5 to 95 parts of dissolved "zein-base" protein, as plasticizer therefor from 95 to 5 parts of dissolved ether monocarboxylic acid having not over 21 carbon atoms, and a volatile mutual solvent for said materials.

16. A zein coating composition comprising by weight and in solution form from 5 to 95 parts of dissolved zein, as plasticizer therefor from 95 to 5 parts of dissolved ether monocarboxylic acid having not over 21 carbon atoms, and a volatile mutual solvent for said materials.

17. A plasticized "prolamine-base" protein composition comprising plasticized "prolamine-base" protein having as plasticizer therefor ether monocarboxylic acid having not over 21 carbon atoms and characterized by the essential group $\equiv C-O-C\equiv$ of which group the terminal carbon atoms are united to atoms selected from the group consisting of carbon and hydrogen.

18. A "prolamine-base" protein composition comprising by weight and in homogeneous association from 5 to 95 parts of "prolamine-base" protein, and as plasticizer therefor from 95 to 5 parts of plasticizing ether monocarboxylic acid having not over 21 carbon atoms and having the general formula $R'-O-R-COOH$ wherein each of R and R' are organic radicals, and wherein the carbon atoms are not in excess of 21.

19. A plasticized prolamine composition comprising plasticized gliadin having as plasticizer therefor ether monocarboxylic acid having not over 21 carbon atoms.

20. A plasticized prolamine composition comprising plasticized hordein having as plasticizer therefor ether monocarboxylic acid having not over 21 carbon atoms.

21. A plasticized prolamine composition consisting of plasticized gliadin having as plasticizer therefor ether monocarboxylic acid having not over 21 carbon atoms.

22. A plasticized prolamine composition consisting of plasticized hordein having as plasticizer therefor ether monocarboxylic acid having not over 21 carbon atoms.

WILLARD L. MORGAN.
CARL R. FAELTEN.

REFERENCES CITED

The following references are of record in the file of this patent:

UNITED STATES PATENTS

| Number | Name | Date |
|---|---|---|
| 2,010,154 | Hubacher | Aug. 6, 1935 |
| 2,115,716 | Hansen | May 3, 1938 |
| 2,185,110 | Coleman | Dec. 26, 1939 |
| 2,243,644 | Myers | May 27, 1941 |
| 2,246,779 | Coleman | June 24, 1941 |

FOREIGN PATENTS

| Number | Country | Date |
|---|---|---|
| 386,542 | Great Britain | Jan. 19, 1933 |